United States Patent
Kumar et al.

(10) Patent No.: US 11,106,427 B2
(45) Date of Patent: Aug. 31, 2021

(54) MEMORY FILTERING FOR DISAGGREGATE MEMORY ARCHITECTURES

(71) Applicant: INTEL CORPORATION, Santa Clara, CA (US)

(72) Inventors: Karthik Kumar, Chandler, AZ (US); Francesc Guim Bernat, Barcelona (ES); Thomas Willhalm, Sandhausen (DE); Mark A. Schmisseur, Phoenix, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 272 days.

(21) Appl. No.: 15/719,853

(22) Filed: Sep. 29, 2017

(65) Prior Publication Data

US 2019/0102147 A1    Apr. 4, 2019

(51) Int. Cl.
G06F 17/00 (2019.01)
G06F 7/08 (2006.01)
G06F 16/248 (2019.01)
G06F 16/11 (2019.01)

(52) U.S. Cl.
CPC .............. *G06F 7/08* (2013.01); *G06F 16/113* (2019.01); *G06F 16/248* (2019.01)

(58) Field of Classification Search
CPC ...... G06F 16/113; G06F 16/248; G06F 16/31; G06F 16/335; G06F 7/08; G06F 3/0644; G06F 3/067; G06F 3/0649; G06F 11/1446

See application file for complete search history.

(56) References Cited

U.S. PATENT DOCUMENTS

| | | | |
|---|---|---|---|
| 9,171,151 B2* | 10/2015 | Behrendt | G06F 21/552 |
| 10,402,124 B2* | 9/2019 | Guim Bernat | G06F 9/5077 |
| 2008/0040381 A1 | 2/2008 | Madan et al. | |
| 2010/0205674 A1* | 8/2010 | Zorn | G06F 21/552 726/25 |
| 2010/0268788 A1* | 10/2010 | Arimilli | G06F 9/54 709/213 |
| 2010/0287142 A1* | 11/2010 | Wesener | G06F 3/0623 707/667 |

(Continued)

OTHER PUBLICATIONS

David A Patterson et al., A Case for Redundant Arrays of Inexpensive Disks (RAID), Jun. 1988 SIGMOD '88: Proceedings of the 1988 ACM SIGMOD International Conference on Management of Data, vol. 17 Issue 3, pp. 109-116, (Year: Jun. 1988).*

(Continued)

*Primary Examiner* — Greta L Robinson
(74) *Attorney, Agent, or Firm* — Kacvinsky Daisak Bluni PLLC

(57) ABSTRACT

Examples may include a data center in which memory sleds are provided with logic to filter data stored on the memory sled responsive to filtering requests from a compute sled. Memory sleds may include memory filtering logic arranged to receive filtering requests, filter data stored on the memory sled, and provide filtering results to the requesting entity. Additionally, a data center is provided in which fabric interconnect protocols in which sleds in the data center communicate is provided with filtering instructions such that compute sleds can request filtering on memory sleds.

13 Claims, 9 Drawing Sheets

(56) References Cited

U.S. PATENT DOCUMENTS

| | | | |
|---|---|---|---|
| 2011/0040771 A1* | 2/2011 | Gilyadov | G06F 13/385 |
| | | | 707/754 |
| 2014/0032516 A1 | 1/2014 | Sukhwani et al. | |
| 2014/0136552 A1* | 5/2014 | Jakobsen | G06F 21/6227 |
| | | | 707/754 |
| 2014/0136762 A1 | 5/2014 | Li et al. | |
| 2017/0093756 A1* | 3/2017 | Guim Bernat | H04L 5/0055 |
| 2018/0004687 A1* | 1/2018 | Guim Bernat | G06F 13/4022 |
| 2019/0065083 A1* | 2/2019 | Sen | H05K 7/1498 |

OTHER PUBLICATIONS

M. S. Birrittella et al., "Enabling Scalable High-Performance Systems with the Intel Omni-Path Architecture," in IEEE Micro, vol. 36, No. 4, pp. 38-47, Jul.-Aug. 2016, doi: 10.1109/MM.2016.58. (Year: 2016).*

European Search Report for the European Patent Application No. 18191339, dated Dec. 13, 2018.

\* cited by examiner

*Logic Flow 700*

MEMORY FILTERING FOR DISAGGREGATE MEMORY ARCHITECTURES

TECHNICAL FIELD

Embodiments described herein generally relate to data centers and particularly to disaggregate memory architectures implemented in some data centers.

BACKGROUND

Advancements in networking have enabled the rise in pools of physical resources. A pool of physical resources may be formed from a physical infrastructure including disaggregate physical resources, such as, for example, compute and storage resources. The physical infrastructure can include several computing systems having processors, memory, storage, networking, power, cooling, etc. and warehoused in a data center. Data stored within such data centers can be spread across several nodes in the data center. A range of data analytics can be applied to the data stored within such data centers. For example, various queries can be made to the data.

DETAILED DESCRIPTION

Data centers may generally be composed of many racks that can contain numerous types of hardware or configurable resources (e.g., processing units, memory, storage, accelerators, networking, fans/cooling modules, power units, etc.). The types of hardware or configurable resources deployed in data centers may also be referred to as physical resources or disaggregate elements. It is to be appreciated, that the size and number of physical resources within a data center can be large, for example, on the order of hundreds of thousands of physical resources. Furthermore, these physical resources can be pooled to form virtual computing platforms for a large number and variety of computing tasks.

Often, a data center will include a variety of resources, such as, compute resources (e.g., central processing units, or the like) and storage resources (e.g., memory). Data sets stored within a data center can be large. As such, these data sets may be spread across multiple nodes in a data center. Data analytics applied to these data sets can include multiple operations. For example, several range based queries or filters can be applied to the data set. Often, composite queries are applied to these data sets. For example, consider a data set storing information about cars. An example composite query could include the query find all cars made between 2000 and 2009, which can be followed by the query find all cars made between 2000 and 2009 that are white in color. Conventional data centers must move large volumes of data, often the entire table for each query in the composite query. As can be appreciated, this presents a significant drag on efficiency and performance of the data center.

The present disclosure provides memory sleds within a data center arranged to filter a data set and provide the filtered data set to a compute sled within the data center. Additionally, the present disclosure provides query operations and/or instructions that can be executed on a memory sled to cause the memory sled to filter a data set and provide the filtered data set to a compute sled.

Figure 1:
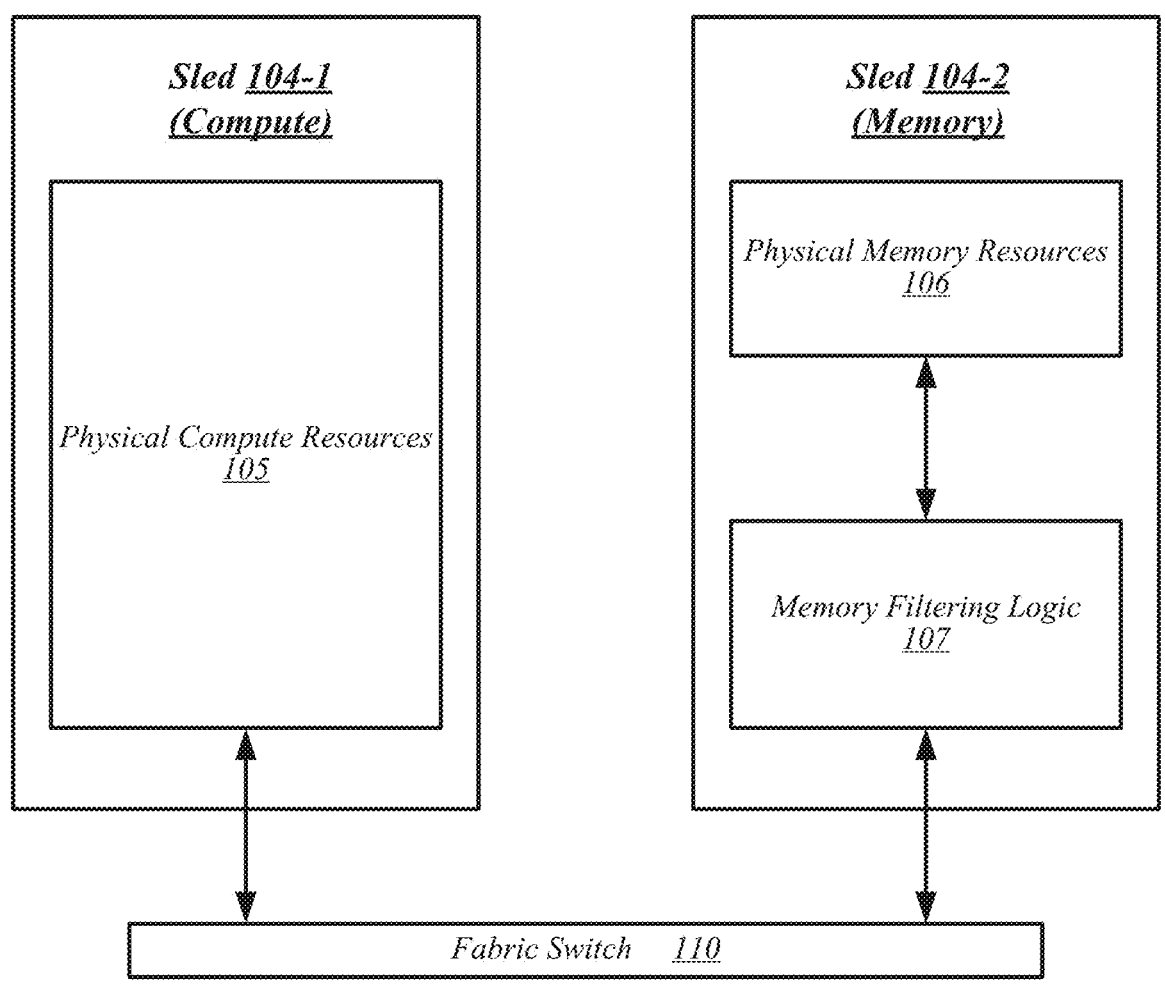
FIG. 1 illustrates a first example data center.

FIG. 1 illustrates an example data center 100. In this illustrative example, data center 100 comprises several sleds 104 that each comprise a quantity of physical resources. In general, data center 100 can comprise any number and combination of types of sleds 104 (e.g., compute, storage, memory, accelerator, etc.) However, a limited number and type of sleds 104 are depicted in this figure for clarity of presentation.

As depicted, sled 104-1 can comprise physical compute resources 105. In general, physical compute resources can be any logic, implemented in hardware, arranged to execute instructions, process data, and/or provide computing resources within data center 100. For example, physical compute resources 105 can be a general-purpose processor unit, an application specific processor units (ASICs), multiple general-purpose processor units, multiple ASICs, or some combination of general-purpose processor unit(s) and ASIC(s).

Sled 104-2 can comprise physical memory resources 106. In general, physical memory resources 106 can be any of a variety of computer readable memories including volatile memory and non-volatile memory. For example, physical memory resources 106 can be a volatile memory, which may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

As another example, physical memory resources 106 can be non-volatile memory, which may be a storage medium that does not require power to maintain the state of data stored by the medium. Embodiments may be applied to any memory device that comprise non-volatile memory. In one embodiment, the memory device is a block addressable memory device. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product.

In some embodiments, 3D crosspoint memory may comprise a transistor-less stackable cross point architecture in which memory cells sit at the intersection of word lines and bit lines and are individually addressable and in which bit storage is based on a change in bulk resistance.

The physical compute resources 105 of sled 104-1 are coupled to physical memory resources 106 of sled 104-2. In this manner, physical compute resources 105 can utilize (e.g., read, write, or the like) the memory of physical memory resources 106.

In some examples, physical compute resources 105 can be coupled to physical memory resources 106 via a local interface. Such a local interface can be implemented according to double-data rate fourth generation (DDR4) synchronous dynamic random-access memory (SDRAM) Specification, Rev. A, published in November 2013. In some examples, physical compute resources 105 can be coupled to physical memory resources 106 via a fabric interface, such as fabric switch 110. With some examples, sleds 104 within data center 100 can be coupled via a fabric, such as an optical fabric. The sleds can be arranged to send and/or receive communications according to multiple link-layer protocols via a same unified set of optical signaling media, and properly switching such communications represented by the fabric switch 110. With some examples, fabric switch 110 can be a dual-mode optical switch capable of receiving both Ethernet protocol communications carrying Internet Protocol (IP packets) and communications according to a second, high-performance computing (HPC) link-layer protocol (e.g., Intel® Omni-Path Architecture®, Infiniband®, or the like) via optical signaling media of an optical fabric. Embodiments are not limited to this example.

Sled 104-2 further includes memory filtering logic 107. Memory filtering logic 107, a portion of which is comprised in hardware, is generally arranged to receive a control signal or instruction from sled 104-1 including an indication to filter data stored on physical memory resources 106. With some examples, physical compute resources 105 can send an instruction to memory filtering logic 107 including an indication to filter data stored on physical memory resources. For example, the instruction can include an indication of a query to apply to the data. Memory filtering logic 107 can receive the instruction. Responsive to receiving the instruction, memory filtering logic 107 can filter data stored on the physical memory resources and provide a filtered data set to physical compute resources 105. In some examples, memory filtering logic 107 can generate a filtered data set and provide the filtered data set to the compute sled 104-1. With some examples, memory filtering logic 107 can generate a filtered data set table including indications of results matching the filtering request (e.g., the query).

Figure 2:
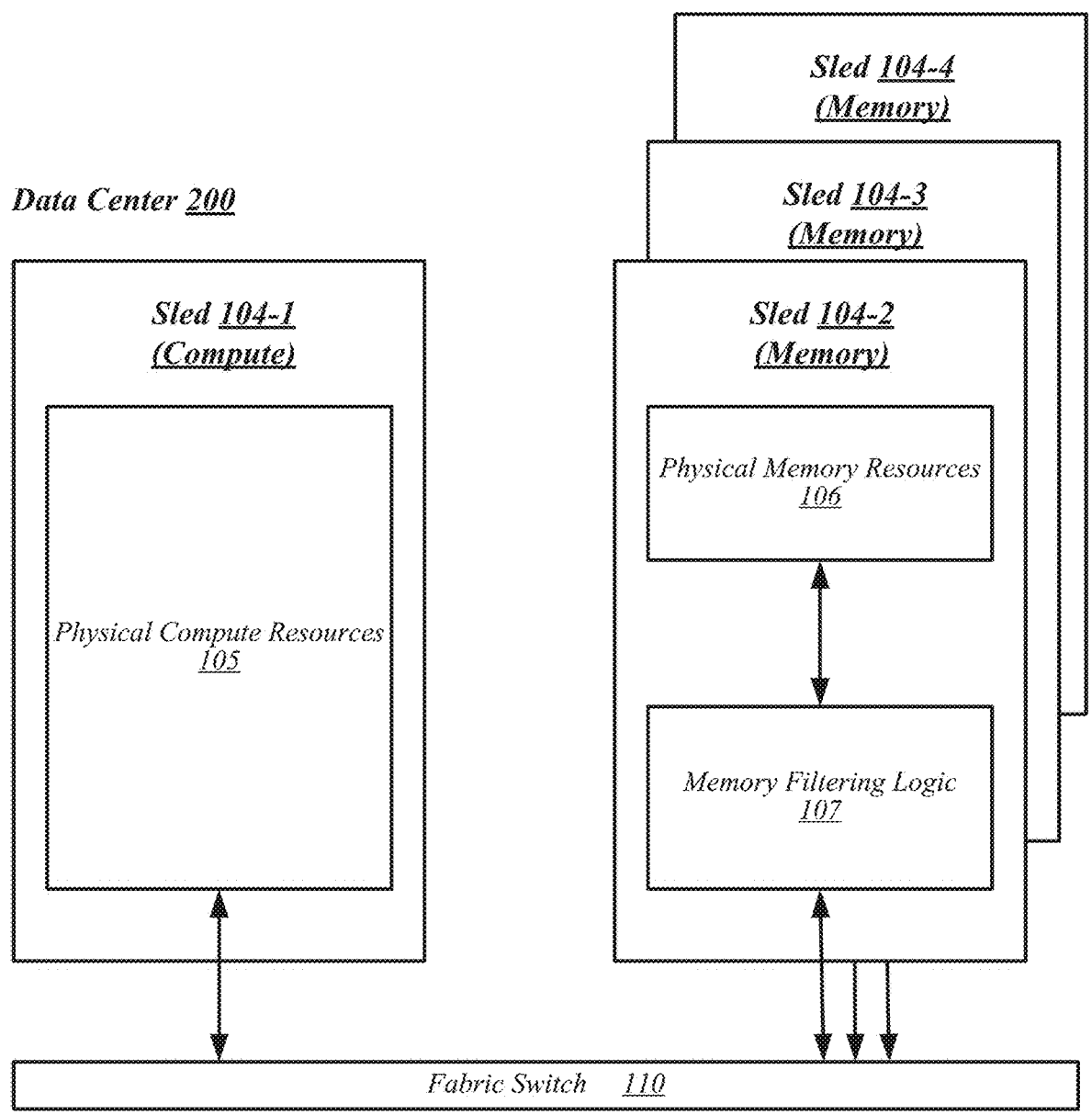
FIG. 2 illustrates a second example data center.

FIG. 2 illustrates an example data center 200. In this illustrative example, data center 200 comprises several sleds. Sleds in data center 200 can be like sleds in data center 100 of FIG. 1. Thus, sleds depicted in this figure are labeled sleds 104 for purposes of convenience and brevity of description. As depicted, data center 200 includes a sled 104-1 comprising physical compute resources 105 and several sleds 104 each comprising physical memory resources 106 and memory filtering logic 107. For example, data center 200 includes "memory" sleds 104-2, 104-3 and 104-4, which each include physical memory resources 106 and memory filtering logic 107.

The physical compute resources 105 of sled 104-1 are coupled to physical memory resources 106 of sleds 104-2, 104-3 and 104-4 via fabric switch 110. In this manner, physical compute resources 105 can utilize (e.g., read, write, or the like) the memory of physical memory resources 106 within any one or more of sleds 104-2, 104-3 and/or 104-4.

In general, physical compute resources 105 of sled 104-1 can send instructions to one or more of sleds 104-2, 104-3, and/or 104-4 including indications to filter a data set stored in physical memory resources 106 of on sleds 104-2 to 104-4. For example, in some data centers, a complete data set can be spread across multiple nodes within a data center. Said differently, a complete data set can be stored on multiple sleds within data center 200. For example, sled 104-2 and 104-3 could store portions of a data set in which physical compute resources 105 may execute queries.

Memory filtering logic 107, of any one of sleds 104-2 to 104-4, a portion of which is comprised in hardware, is generally arranged to receive a control signal or instruction from sled 104-1 including an indication to filter data stored on physical memory resources 106. With some examples, physical compute resources 105 can send an instruction to memory filtering logic 107 (of any one or more of sleds 104-2 to 104-4) including an indication to filter data stored on physical memory resources. For example, the instruction can include an indication of a query to apply to the data. Memory filtering logic 107 can receive the instruction. Responsive to receiving the instruction, memory filtering logic 107 can filter data stored on the physical memory resources 106 and provide a filtered data set to physical compute resources 105. In some examples, memory filtering logic 107 can generate a filtered data set and provide the filtered data set to the compute sled 104-1. With some examples, memory filtering logic 107 can generate a filtered data set table including indications of results matching the filtering request (e.g., the query).

Figure 3:
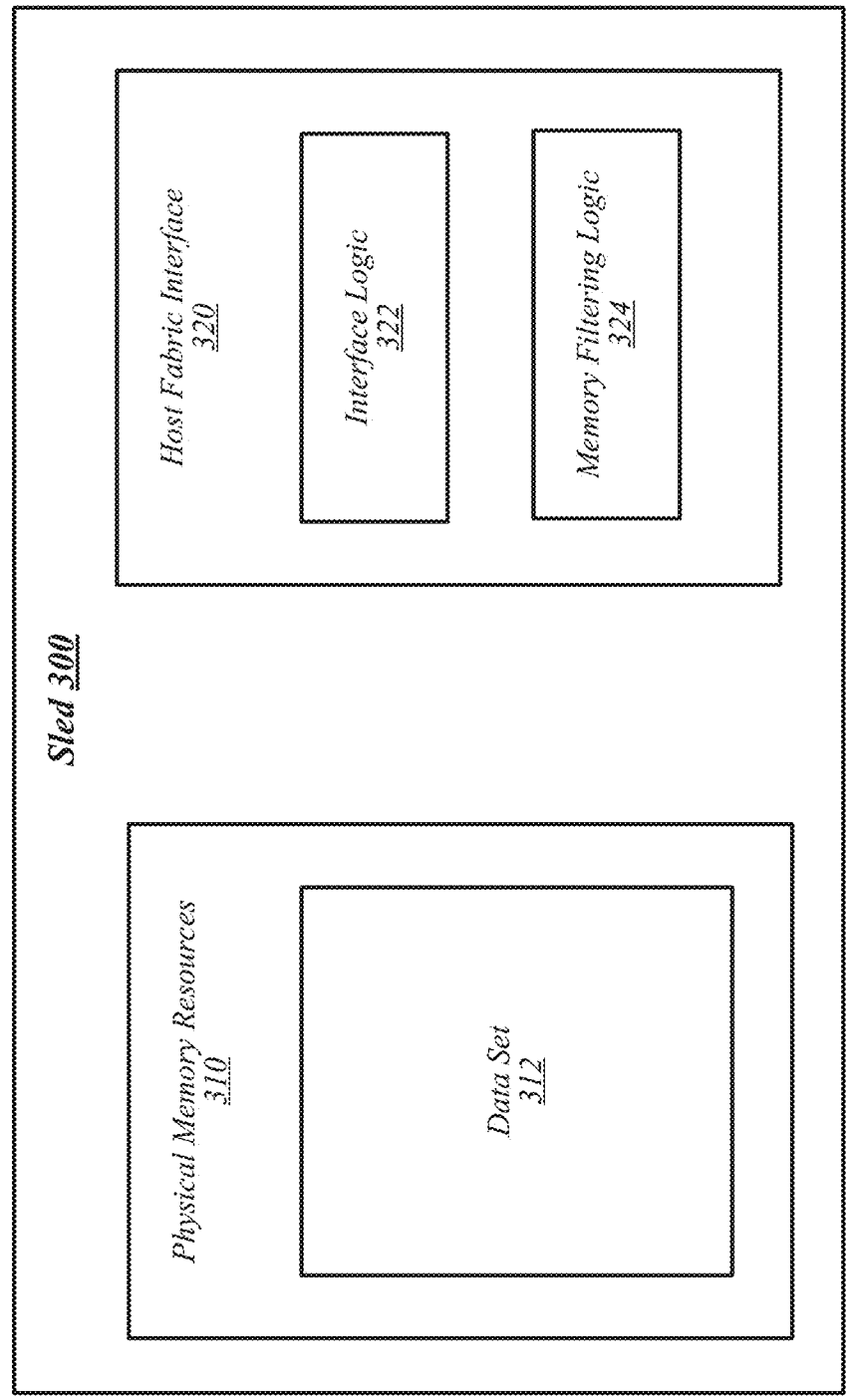
FIG. 3 illustrates a first example sled for a data center.
Figure 4:
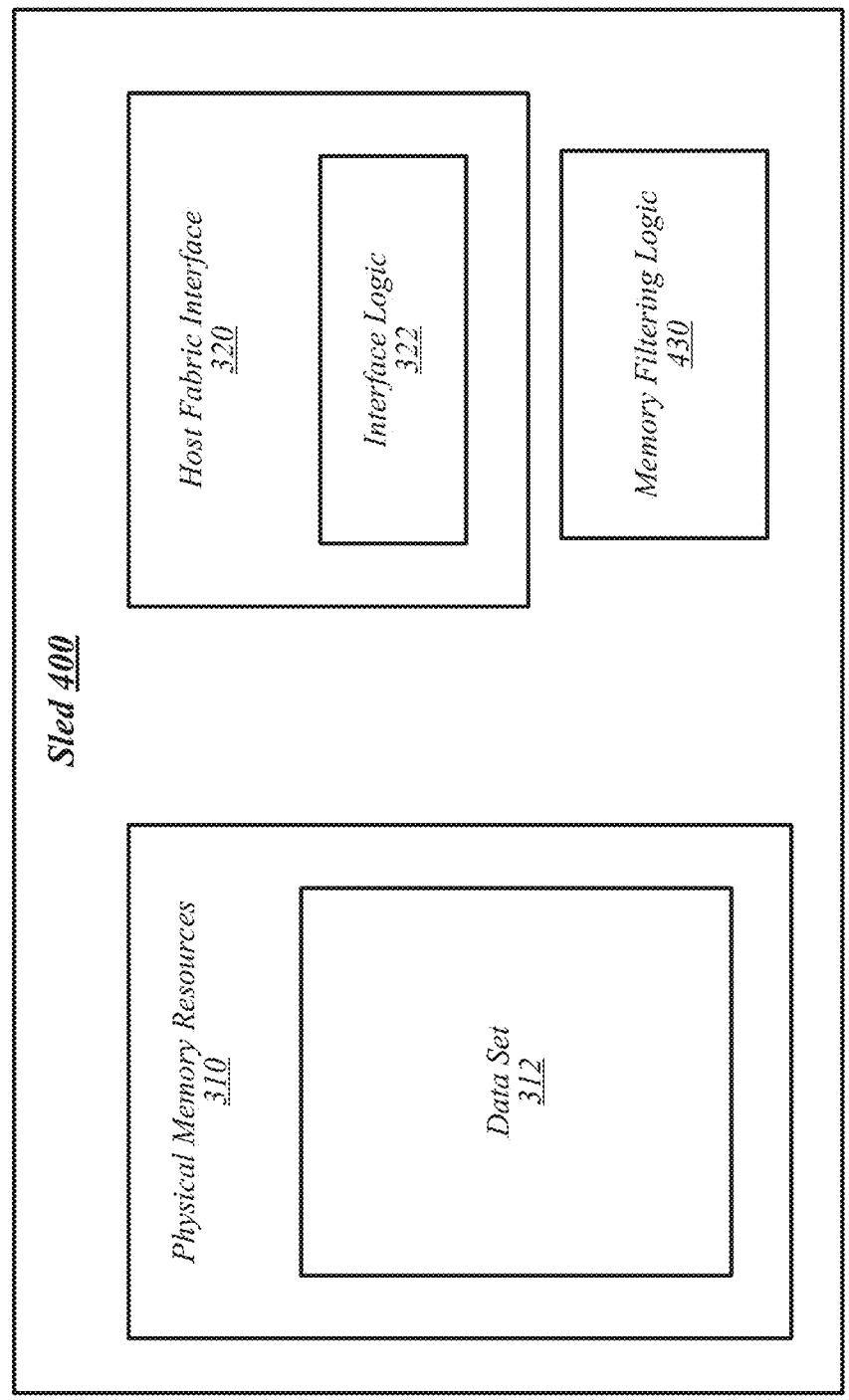
FIG. 4 illustrates a second example sled for a data center.

FIGS. 3-4 illustrate example sleds 300 and 400, respectively. In general, sleds 300 and 400 are representative of a sled that can be implemented in a data center to provide disaggregate memory resources. Furthermore, sleds 300 and 400 can be arranged to filter data stored on the sleds and provide the filtered data to another sled within a data center to reduce transferring entire data sets over fabric. In some examples, sleds 300 and/or 400 could be implemented as sled 104-2 of data center 100 of FIG. 1 or as one or more of sleds 104-2 to 104-4 of data center 200 of FIG. 2.

Turning more specifically to FIG. 3, sled 300 is depicted. As can be seen, sled 300 comprises physical memory resources 310 and a host fabric interface (HFI) 320. In general, sled 300 can be coupled to other resources (e.g., sleds, disaggregate elements, compute resources, or the like) within a data center via HFI 320. In the depicted example, HFI 320 includes interface logic 322 and memory filtering logic 324. In general interface logic 322 is arranged to couple sled 300 to other resources. For example, interface logic 300 can be arranged to provide access to (e.g., reading, writing, or the like) physical memory resources 310 over a fabric coupled to HFI 320. In some examples, HFI 320 can be arranged to operate in compliance with one or more communication standards and/or protocols. For example, HFI 320, via interface logic 322, can be arranged to operate in compliance with either or both of Ethernet protocol communications carrying Internet Protocol (IP packets) and communications according to a second, high-performance computing (HPC) link-layer protocol (e.g., Intel® Omni-Path Architecture®, Infiniband®, or the like) via optical signaling media of an optical fabric. Embodiments are not limited to this example.

Physical memory resources 310 can include any of a variety of computer readable memories including volatile memory and non-volatile memory arranged to store data set 312. For example, physical memory resources 310 can be a volatile memory, which may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

As another example, physical memory resources 310 can be non-volatile memory, which may be a storage medium that does not require power to maintain the stat of data stored by the medium. Embodiments may be applied to any memory device that comprise non-volatile memory. In one embodiment, the memory device is a block addressable memory device. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product.

In some embodiments, 3D crosspoint memory may comprise a transistor-less stackable cross point architecture in which memory cells sit at the intersection of word lines and bit lines and are individually addressable and in which bit storage is based on a change in bulk resistance.

With some examples, memory filtering logic 324 can be an application specific integrated circuit (ASIC) arranged to receive a control signal or instruction over a fabric coupled to HFI 320. In general, the instructions can include an indication to filter data set 312. For example, memory filtering logic 324 can be arranged to receive filtering requests, process filtering requests, and provide filter results to a requestor. This is described in greater detail below, for example, with respect to FIG. 5.

Turning more specifically to FIG. 4, sled 400 is depicted. As can be seen, sled 400 includes similar features to sled 300. For example, sled 400 includes physical memory resources 310 arranged to store data set 312. Furthermore, sled 400 includes HFI 320 including interface logic 322 arranged to couple sled 400 to a fabric and to receive instructions over the fabric including an indication to filter data set 312 and provide a filtered result to a requestor over the fabric.

Sled 400 additionally includes memory filtering logic 430. It is noted, that with some examples, such as that depicted in this figure, memory filtering logic 430 can be implemented outside the HFI 320. For example, memory filtering logic 430 can be an ASIC arranged to receive a control signal or instruction over a fabric coupled to HFI 320. In general, the instructions can include an indication to filter data set 312. For example, memory filtering 430 can be arranged to receive filtering requests, process filtering requests, and provide filter results to a requestor. This is described in greater detail below, for example, with respect to FIG. 5.

Figure 5:
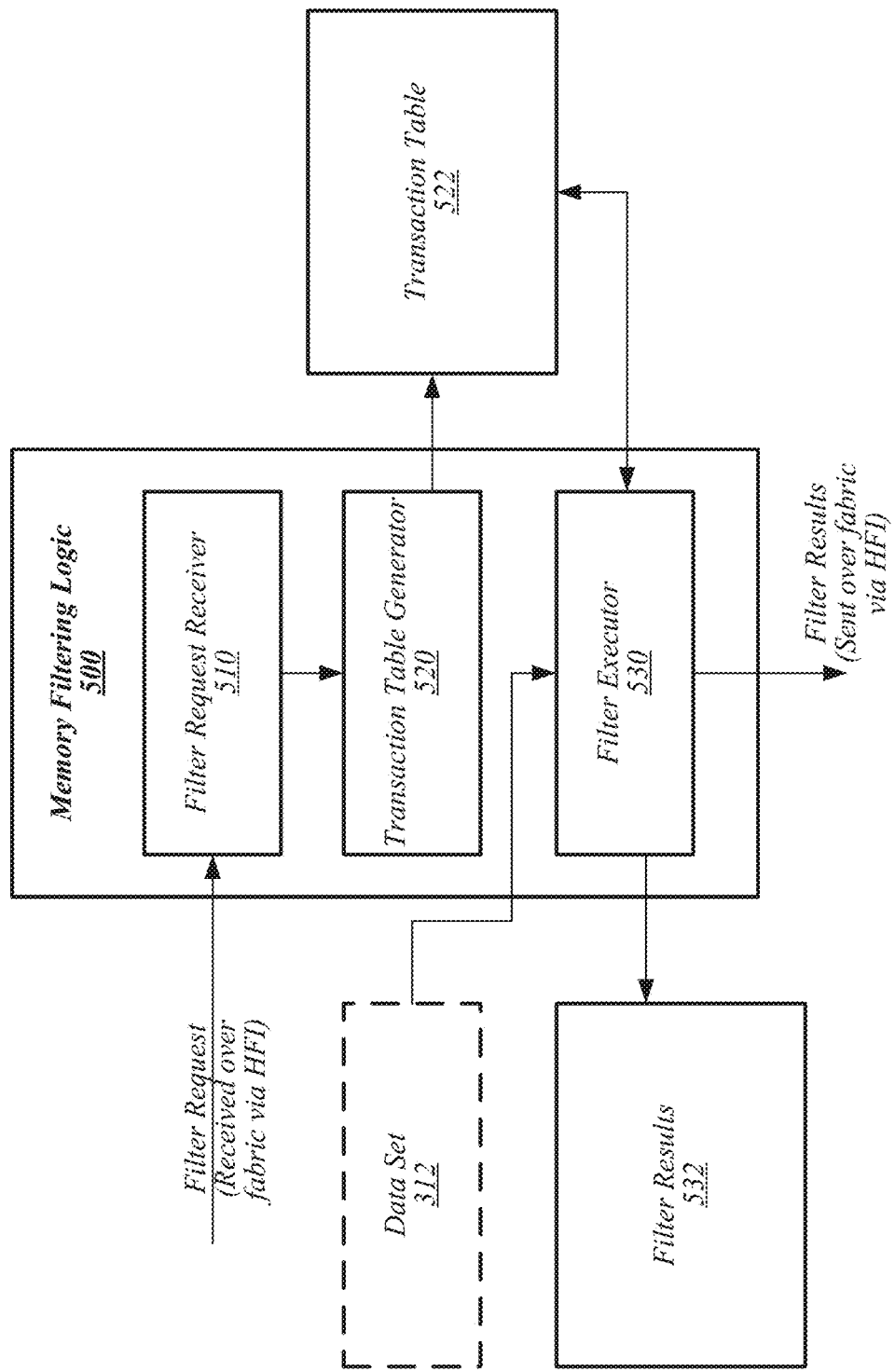
FIG. 5 illustrates a first example memory filtering logic.

FIG. 5 illustrates an example memory filtering logic 500, arranged according to some examples of the present disclosure. Memory filtering logic 500 can be implemented as any one of memory filtering logics 107, 324 or 430 depicted in the previous figures. Examples are not limited in this context. Memory filtering logic 500 can include a filter request receiver 510, transaction table generator 520, and a filter executer 530. In general, filter request receiver 510, transaction table generator 520 and filter executor 530 can be implemented in hardware, or can be implemented as software, such as, as instructions stored on a non-transitory computer-readable medium and executable by a processor (e.g., memory filtering logic, or the like). For example, filter request receiver 510, transaction table generator 520 and filter executor 530 can be implemented in an ASIC as described herein. In such an example, memory filtering logic 500 can comprise circuitry forming logical operations and memory to store results of such logical operations as described herein and implemented by memory filtering logic 500.

In general, memory filtering logic 500 can be arranged to receive filtering requests, process filtering requests, and provide filter results to a requestor. Filter request receiver 510 can receive instructions over fabric including an indication to filter a data set. For example, filter request receiver 510 can receive an instruction (e.g., from compute sled 140-1, or the like) over fabric (e.g., via HFI 320, or the like) including an indication to filter a data set (e.g., data set 312, or the like).

As described herein, elements (e.g., sleds, or the like) of a data center are coupled via a fabric. Such elements communicate via the fabric using one or more communication protocols. These communication protocols can be extended such that fabric interfaces (e.g., network interfaces, host fabric interfaces, or the like) of these data center elements can send and receive instructions including indications to filter a data set. For example, a fabric protocol could be extended with a "FILTER" instruction that can be attached or communicated to one or more memory sleds. In some examples, the filter instruction can include an indication of a memory range in which to filter, an upper filtering value, a lower filtering value.

Transaction table generator 520 can generate a transaction table 522 including indication of received filter requests. In some examples, transaction table 522 can including an indication of a requestor (e.g., compute sled 104-1, or the like), an indication of the filter request, and a status of the filter request (e.g., unprocessed, processing, processed, or the like). With some examples, transaction table generator 520 can generate transaction table 522 and store transactions table 522 in physical memory resources of the memory sled in which memory filtering logic 500 is implemented. In some examples, memory filtering logic 500 can be provided with memory to store transaction table 522. Examples are not limited in this context.

Filter executor 530 can execute the filter request and provide the results to a requestor (e.g., compute sled, or the like). In some examples, filter executor 530 can be arranged to execute filter requests indicated in the transaction table 522 and generate filter results 532. For example, given a simple data set represented in the following table:

| Name | Age |
|------|-----|
| Bob | 39 |
| Peter | 20 |
| Sally | 18 |
| Mark | 23 |
| Bobby | 45 |
| Draco | 77 |

Filter executor could execute a filter request including an indication to filter all people between the ages of 21 and 25. As such, filter executor could generate filter results 532 including an indication of Mark and return an indication of Mark to the requestor. Accordingly, a significant reduction in data communicated over fabric is provided.

Figure 6:
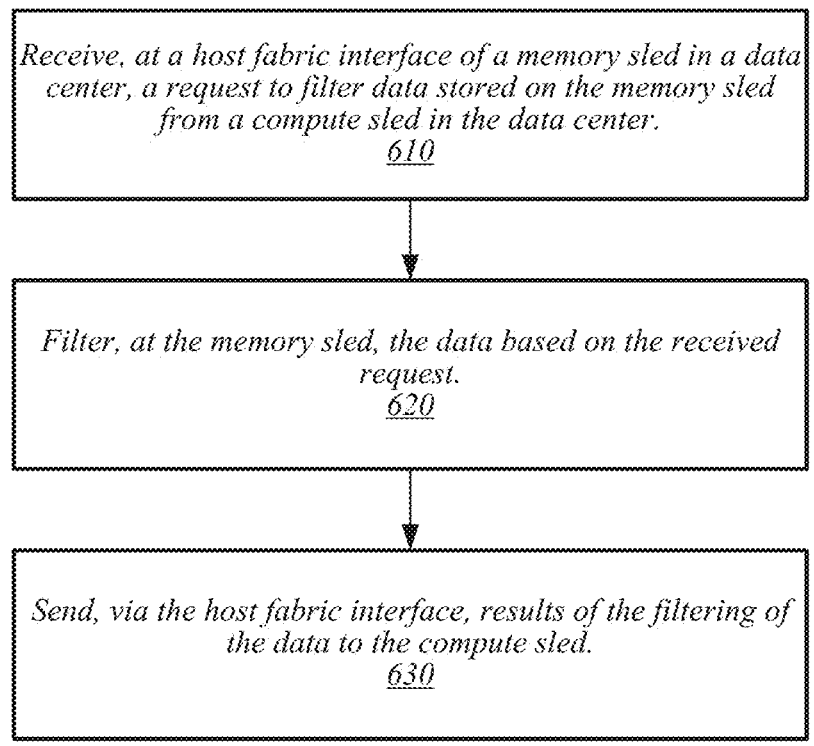
FIG. 6 illustrates a first example logic flow.
Figure 7:
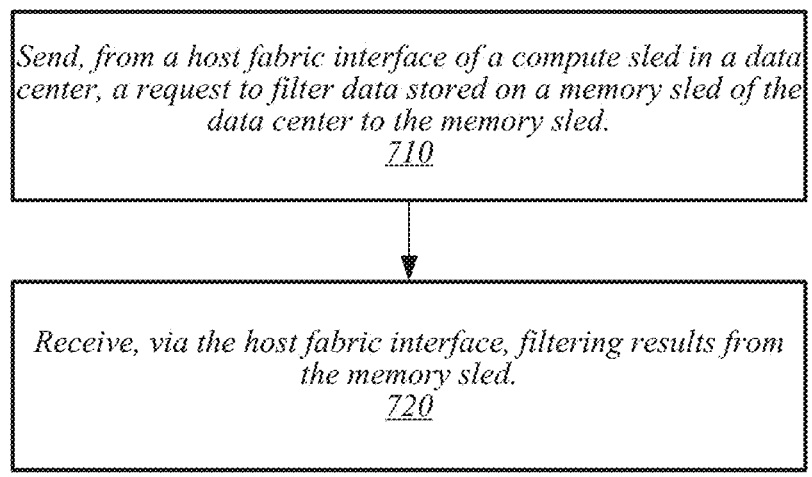
FIG. 7 illustrates a second example logic flow.

FIGS. 6-7 depict logic flows 600 and 700, respectively. Logic flows 600 and 700 can be implemented by sleds of a data center, in accordance with various examples of the present disclosure. Logic flows 600 and 700, as well as other logic flows described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Turning more particularly to FIG. 6 and logic flow 600. Logic flow 600 may be representative of some or all the operations executed by one or more embodiments described herein to filter data at a memory sled. For example, logic flow 600 may illustrate operations performed by a memory sled (e.g., sled 104-2 to 104-4, or the like) and particularly memory filtering logic (e.g., logic 107, logic 324, logic 430, logic 500, or the like).

Logic flow 600 may begin at block 610. At block 610 "receive, at a host fabric interface of a memory sled in a data center, a request to filter data stored on the memory sled from a compute sled in the data center" a memory sled can receive an instruction including indication to filter data stored on the memory sled. For example, an HFI (e.g., HFI 320, or the like) of a memory sled (e.g., sled 300, sled 400, or the like) can receive an instruction to filter data stored on the sled.

Continuing to block 620 "filter, at the memory sled, the data based on the received request" the memory sled can filter stored data responsive to the received request. For example, memory filtering logic (e.g., logic 107, logic 324, logic 430, logic 500, or the like) on the memory sled can filter stored data based on the request filter request.

Continuing to block 630 "send, via the host fabric interface, results of the filtering of the data to the compute sled" the memory sled can send filtering results to the compute sled. For example, memory sled (e.g., sled 300, sled 400, or the like) can send results from filtering the data to a requestor (e.g., compute sled, or the like) of the filtering.

Turning more particularly to FIG. 7 and logic flow 700. Logic flow 700 may be representative of some or all the operations executed by one or more embodiments described herein to request filtering of data at a memory sled. For example, logic flow 700 may illustrate operations performed by a compute sled (e.g., sled 104-1, or the like).

Logic flow 700 may begin at block 710. At block 710 "send, from a host fabric interface of a compute sled in a data center, a request to filter data stored on a memory sled to the memory sled" a compute sled can send an instruction including indication to filter data stored on a memory sled to the memory sled. For example, an HFI of a compute sled (e.g., 104-1, or the like) can send an instruction to filter data stored on a memory sled to the memory sled.

Continuing to block 720 "receive, via the host fabric interface, filtering results from the memory sled" the compute sled can receive results of the requested filtering from the memory sled.

Figure 8:
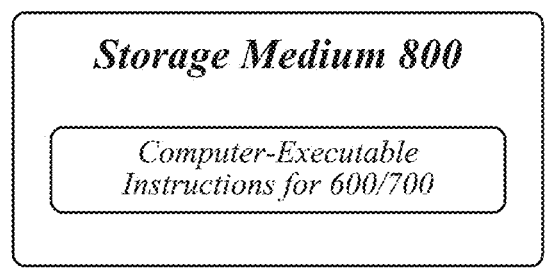
FIG. 8 illustrates a first example storage medium.

FIG. 8 illustrates an example of a storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 600 and/or logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
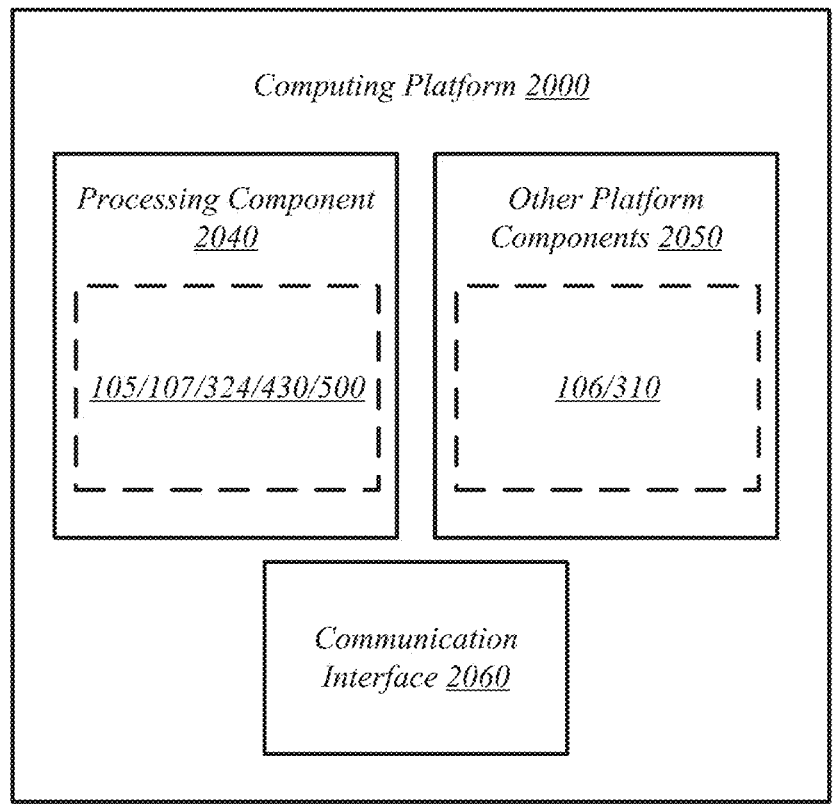
FIG. 9 illustrates an example computing platform.

FIG. 9 illustrates an example computing platform 2000. In some examples, as shown in this figure, computing platform 2000 may include a processing component 2040, other platform components or a communications interface 2060. According to some examples, computing platform 2000 may be implemented in a computing device such as a server in a system such as a data center or server farm that supports a manager or controller for managing configurable computing resources as mentioned above.

According to some examples, processing component 2040 may include hardware or logic for apparatus described herein, such as, physical compute resources (e.g., 105, 107, 324, 430, 500, or the like). Processing component 2040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASICs), programmable logic devices (PLDs), digital signal processors (DSPs), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 2050 may include common computing elements, such as one or more processors, multi-core processors, co-processors, memory units (e.g., memory (e.g., 106, 310, or the like)), chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 2060 may include logic and/or features to support a communication interface. For these examples, communications interface 2060 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 2000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 2000 described herein, may be included or omitted in various embodiments of computing platform 2000, as suitably desired.

The components and features of computing platform 2000 may be implemented using any combination of discrete circuitry, ASICs, logic gates and/or single chip architectures. Further, the features of computing platform 2000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 2000 shown in the block diagram of this figure may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASICs), programmable logic devices (PLDs), digital signal processors (DSPs), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Figure 10:
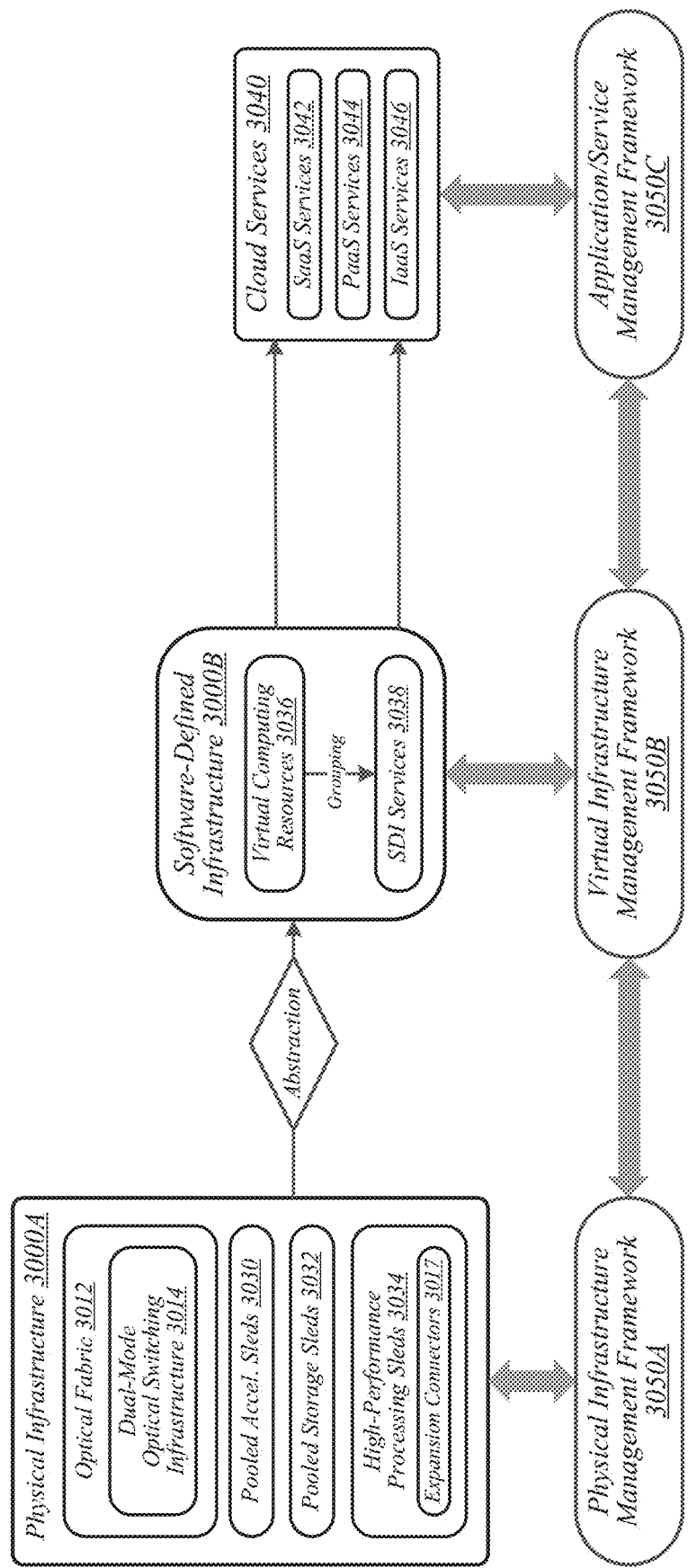
FIG. 10 illustrates a third example data center.

FIG. 10 illustrates an example of a data center 3000 that may generally be representative of one in/for which one or more techniques described herein may be implemented according to various embodiments. As reflected in this figure, a physical infrastructure management framework 3050A may be implemented to facilitate management of a physical infrastructure 3000A of data center 3000. In various embodiments, one function of physical infrastructure management framework 3050A may be to manage automated maintenance functions within data center 3000, such as the use of robotic maintenance equipment to service computing equipment within physical infrastructure 3000A. In some embodiments, physical infrastructure 3000A may feature an advanced telemetry system that performs telemetry reporting that is sufficiently robust to support remote automated management of physical infrastructure 3000A. In various embodiments, telemetry information provided by such an advanced telemetry system may support features such as failure prediction/prevention capabilities and capacity planning capabilities. In some embodiments, physical infrastructure management framework 3050A may also be configured to manage authentication of physical infrastructure components using hardware attestation techniques. For example, robots may verify the authenticity of components before installation by analyzing information collected from a radio frequency identification (RFID) tag associated with each component to be installed.

As depicted, the physical infrastructure 3000A of data center 3000 may comprise an optical fabric 3012, which may include a dual-mode optical switching infrastructure 3014. As discussed above, connectivity may make it feasible to disaggregate and dynamically pool resources such as processors, accelerators, memory, and storage. In some embodiments, for example, one or more pooled accelerator sleds 3030 may be included among the physical infrastructure 3000A of data center 3000, each of which may comprise a pool of accelerator resources—such as co-processors and/or field-programmable gate arrays (FPGAs), for example—that is available globally accessible to other sleds via optical fabric 3012 and dual-mode optical switching infrastructure 3014.

In another example, in various embodiments, one or more pooled storage sleds 3032 may be included among the physical infrastructure 3000A of data center 3000, each of which may comprise a pool of storage resources that is available globally accessible to other sleds via optical fabric 3012 and dual-mode optical switching infrastructure 3014. In some embodiments, such pooled storage sleds 3032 may comprise pools of storage devices, such as, for example, solid-state drives (SSDs), hard disk drives, compact disk (CD) drives, digital video disk (DVD) drives, or some combination of storage devise, such as, a disk drive comprising both magnetic and solid-state storage media. In various embodiments, one or more high-performance processing sleds 3034 may be included among the physical infrastructure 3000A of data center 3000. In some embodiments, high-performance processing sleds 3034 may comprise pools of high-performance processors, as well as cooling features that enhance air cooling to yield a higher thermal envelope of up to 250 W or more. In various embodiments, any given high-performance processing sled 3034 may feature an expansion connector 3017 that can accept a far memory expansion sled, such that the far memory that is locally available to that high-performance processing sled 3034 is disaggregated from the processors and near memory comprised on that sled. In some embodiments, such a high-performance processing sled 3034 may be configured with far memory using an expansion sled that comprises a low-latency solid-state memory, such as, a solid-state drive, or memory modules (e.g., DIMMs) comprising solid-state memory. The optical infrastructure allows for compute resources on one sled to utilize remote accelerator/FPGA, memory, and/or storage resources that are disaggregated on a sled located on the same rack or any other rack in the data center. In various embodiments, one or more layers of abstraction may be applied to the physical resources of physical infrastructure 3000A in order to define a virtual infrastructure, such as a software-defined infrastructure 3000B. In some embodiments, virtual computing resources 3036 of software-defined infrastructure 3000B may be allocated to support the provision of cloud services 3040. In various embodiments, particular sets of virtual computing resources 3036 may be grouped for provision to cloud services 3040 in the form of software defined infrastructure (SDI) services 3038. Examples of cloud services 3040 may include—without limitation—software as a service (SaaS) services 3042, platform as a service (PaaS) services 3044, and infrastructure as a service (IaaS) services 3046.

In some embodiments, management of software-defined infrastructure 3000B may be conducted using a virtual infrastructure management framework 3050B. In various embodiments, virtual infrastructure management framework 3050B may be designed to implement workload fingerprinting techniques and/or machine-learning techniques in conjunction with managing allocation of virtual computing resources 3036 and/or SDI services 3038 to cloud services 3040. In some embodiments, virtual infrastructure management framework 3050B may use/consult telemetry data in conjunction with performing such resource allocation. In various embodiments, an application/service management framework 3050C may be implemented in order to provide quality of service (QoS) management capabilities for cloud services 3040.

In particular, the virtual infrastructure management framework 3050B can compose virtual computing platforms (sometimes referred to as virtual computing devices) from elements of physical infrastructure 3000A. Furthermore, with some examples, ones of pooled accelerator sleds 3030 can be dynamically allocated to such virtual computing platforms, for example, to support various ones of could services 3040. The embodiments are not limited in this context.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Example 1

A memory sled for a data center, comprising: a storage medium to store a data set; and a memory filter, at least a portion of which is implemented in hardware, the memory filter to: receive, from a requesting entity in a data center, an instruction including an indication to filter the data set; filter the data set responsive to receiving the instruction; and provide results of the filtering of the data set to the requesting entity.

Example 2

The memory sled of example 1, comprising a host fabric interface (HFI), the HFI to couple the storage medium to a fabric of a data center.

Example 3

The memory sled of example 2, the HFI comprising the memory filter.

Example 4

The memory sled of example 1, the data set a portion of a larger data set.

Example 5

The memory sled of example 1, the data set comprising at least one field, each of the at least one fields having an associated value, the instruction comprising an indication of an upper value, a lower value, and one of the at least one fields.

Example 6

The memory sled of example 5, the memory filter to generate a transaction table comprising an indication of the requesting entity, an indication of the upper value, an indication of the lower value, and an indication of the one of the at least one fields.

Example 7

The memory sled of example 6, the transaction table comprising an indication of a status of the instruction.

Example 8

A host fabric interface (HFI) for a memory sled, the HFI comprising: a fabric interface to physically couple to a fabric of a data center; interface circuitry coupled to the fabric interface and arranged to receive information elements via the fabric interface and to access a storage medium of the memory sled; and a memory filter coupled to the interface circuitry, the memory filter to: receive, from a requesting entity in a data center, an instruction including an indication to filter a data set stored on the storage medium; filter the data set responsive to receiving the instruction; and provide results of the filtering of the data set to the requesting entity.

Example 9

The HFI of example 8, the data set a portion of a larger data set.

Example 10

The HFI of example 8, the data set comprising at least one field, each of the at least one fields having an associated value, the instruction comprising an indication of an upper value, a lower value, and one of the at least one fields.

Example 11

The HFI of example 10, the memory filter to generate a transaction table comprising an indication of the requesting entity, an indication of the upper value, an indication of the lower value, and an indication of the one of the at least one fields.

Example 12

The HFI of example 11, the transaction table comprising an indication of a status of the instruction.

Example 13

A method comprising: receiving, at a memory sled in a data center, an instruction including an indication to filter a data set stored on a storage medium of the memory sled from a requesting entity in the data center; filtering, at the memory sled, the data set responsive to receiving the instruction; and providing, from the memory sled, results of the filtering of the data set to the requesting entity.

Example 14

The method of example 13, comprising filtering the data set responsive to receiving the instructions at a host fabric interface of the memory sled.

Example 15

The method of example 13, the data set a portion of a larger data set.

Example 16

The method of example 13, the data set comprising at least one field, each of the at least one fields having an associated value, the instruction comprising an indication of an upper value, a lower value, and one of the at least one fields.

Example 17

The method of example 16, comprising generating a transaction table comprising an indication of the requesting entity, an indication of the upper value, an indication of the lower value, and an indication of the one of the at least one fields.

Example 18

The method of example 17, the transaction table comprising an indication of a status of the instruction.

Example 19

A computer-readable storage medium that stores instructions for execution by a processor of a memory sled in a data center, the instructions to cause the processor to: receive an instruction including an indication to filter a data set stored on a storage medium of the memory sled from a requesting entity in the data center; filter the data set responsive to receiving the instruction; and provide results of the filtering of the data set to the requesting entity.

Example 20

The computer-readable storage medium of example 19, the processor implemented in a host fabric interface of the memory sled.

Example 21

The computer-readable storage medium of example 19, the data set a portion of a larger data set.

Example 22

The computer-readable storage medium of example 19, the data set comprising at least one field, each of the at least one fields having an associated value, the instruction comprising an indication of an upper value, a lower value, and one of the at least one fields.

Example 23

The computer-readable storage medium of example 22, the instructions to cause the processor to generate a transaction table comprising an indication of the requesting entity, an indication of the upper value, an indication of the lower value, and an indication of the one of the at least one fields.

Example 24

The computer-readable storage medium of example 23, the transaction table comprising an indication of a status of the instruction.

Example 25

A system comprising: a compute sled comprising at least a processor; and a memory sled coupled to the compute sled, the memory sled comprising: a storage medium to store a data set; and a memory filter, at least a portion of which is implemented in hardware, the memory filter to: receive, from the compute sled, an instruction including an indication to filter the data set; filter the data set responsive to receiving the instruction; and provide results of the filtering of the data set to the compute sled.

Example 26

The system of example 25, comprising: a fabric coupled to the compute sled and the memory sled.

Example 27

The system of example 26, the memory sled comprising a host fabric interface (HFI), the HFI to couple the storage medium to the fabric.

Example 28

The system of example 27, the HFI comprising the memory filter.

Example 29

The system of example 25, the data set a portion of a larger data set.

Example 30

The system of example 25, the data set comprising at least one field, each of the at least one fields having an associated value, the instruction comprising an indication of an upper value, a lower value, and one of the at least one fields.

Example 31

The system of example 30, the memory filter to generate a transaction table comprising an indication of the compute sled, an indication of the upper value, an indication of the lower value, and an indication of the one of the at least one fields.

Example 32

The system of example 31, the transaction table comprising an indication of a status of the instruction.

Example 33

The system of example 25, the compute sled a first compute sled and the processor a first processor, the system comprising a second compute sled comprising at least a second processor, the memory filter to: receive, from the second compute sled, an instruction including an indication to filter the data set; filter the data set responsive to receiving the instruction; and provide results of the filtering of the data set to the second compute sled.

Example 34

A host fabric interface (HFI) for a compute sled, the HFI comprising: a fabric interface to physically couple to a fabric of a data center; interface circuitry coupled to the fabric interface and arranged to: send, to a memory sled in a data center, an instruction including an indication to filter a data set stored on a storage medium of the memory sled; and receive, from the memory sled, an information element including indications of results of filtering the data set.

Example 35

The HFI of example 34, the data set a portion of a larger data set.

Example 36

The HFI of example 34, the data set comprising at least one field, each of the at least one fields having an associated value, the instruction comprising an indication of an upper value, a lower value, and one of the at least one fields.

Example 37

A method comprising: sending, to a memory sled in a data center, an instruction including an indication to filter a data set stored on a storage medium of the memory sled; and receiving, from the memory sled, results of filtering of the data set to responsive to the instruction.

Example 38

The method of example 37, the data set a portion of a larger data set.

Example 39

The method of example 37, the data set comprising at least one field, each of the at least one fields having an associated value, the instruction comprising an indication of an upper value, a lower value, and one of the at least one fields.

Example 40

A computer-readable storage medium that stores instructions for execution by a processor of a compute sled in a data center, the instructions to cause the processor to: send an instruction including an indication to filter a data set stored on a storage medium of a memory sled in the data center; and receive, from the memory sled, results of the filtering of the data set responsive to the instruction.

Example 41

The computer-readable storage medium of example 40, the data set a portion of a larger data set.

Example 42

The computer-readable storage medium of example 40, the data set comprising at least one field, each of the at least one fields having an associated value, the instruction comprising an indication of an upper value, a lower value, and one of the at least one fields.

The invention claimed is:

1. A memory sled for a data center, comprising:
a storage medium to store a data set;
a host fabric interface (HFI) to couple the storage medium to a fabric of a data center; and
memory filter circuitry, the memory filter circuitry to:
receive, from a requesting entity in the data center, an instruction including an indication to filter the data set stored on the storage medium, the data set comprising at least one field, the at least one field having an associated value, the instruction comprising an indication of an upper value, an indication of a lower value, and an indication of the at least one field;
filter the data set responsive to receiving the instruction;
provide results of the filtering of the data set to the requesting entity; and
generate a transaction table comprising an indication of the requesting entity, the indication of the upper value, the indication of the lower value, and the indication of the at least one field.

2. The memory sled of claim 1, the HFI comprising the memory filter circuitry.

3. The memory sled of claim 1, the data set a portion of a larger data set.

4. The memory sled of claim 1, the transaction table comprising an indication of a status of the instruction.

5. A host fabric interface (HFI) for a memory sled, the HFI comprising:
a fabric interface to physically couple to a fabric of a data center;

interface circuitry coupled to the fabric interface and arranged to receive information elements via the fabric interface and to access a storage medium of the memory sled; and memory filter circuitry coupled to the interface circuitry, the memory filter circuitry to:

receive, from a requesting entity in the data center, an instruction including an indication to filter a data set stored on the storage medium, the data set comprising at least one field, the at least one field having an associated value, the instruction comprising an indication of an upper value, an indication of a lower value, and an indication of the at least one field;

filter the data set responsive to receiving the instruction;

provide results of the filtering of the data set to the requesting entity; and generate a transaction table comprising an indication of the requesting entity, the indication of the upper value, the indication of the lower value, and the indication of the at least one field.

6. The HFI of claim 5, the data set a portion of a larger data set.

7. The HFI of claim 5, the transaction table comprising an indication of a status of the instruction.

8. A computer-implemented method comprising:

receiving, at a memory sled in a data center, an instruction including an indication to filter a data set stored on a non-transitory storage medium of the memory sled from a requesting entity in the data center, the data set comprising at least one field, the at least one field having an associated value, the instruction comprising an indication of an upper value, an indication of a lower value, and an indication of the at least one field;

filtering, at the memory sled, the data set responsive to receiving the instruction at a host fabric interface of the memory sled;

providing, from the memory sled, results of the filtering of the data set to the requesting entity; and generating, at the memory sled, a transaction table comprising an indication of the requesting entity, the indication of the upper value, the indication of the lower value, and the indication of the at least one field.

9. The method of claim 8, the data set a portion of a larger data set.

10. The method of claim 8, the transaction table comprising an indication of a status of the instruction.

11. A computer-readable storage medium that stores instructions for execution by a processor of a memory sled in a data center, the instructions to cause the processor to:

receive an instruction including an indication to filter a data set stored on a storage medium of the memory sled from a requesting entity in the data center, the data set comprising at least one field, the at least one field having an associated value, the instruction comprising an indication of an upper value, an indication of a lower value, and an indication of the at least one field;

filter the data set responsive to receiving the instruction at a host fabric interface of the memory sled;

provide results of the filtering of the data set to the requesting entity; and generate a transaction table comprising an indication of the requesting entity, the indication of the upper value, the indication of the lower value, and the indication of the at least one field.

12. The computer-readable storage medium of claim 11, the data set a portion of a larger data set.

13. The computer-readable storage medium of claim 11, the transaction table comprising an indication of a status of the instruction.

* * * * *